FIG. I

Dec. 7, 1971   FUMIO SHIINO   3,625,102
CIRCULAR SAWING MACHINE WITH A PAIR OF VISES
Filed Oct. 3, 1969   4 Sheets-Sheet 3

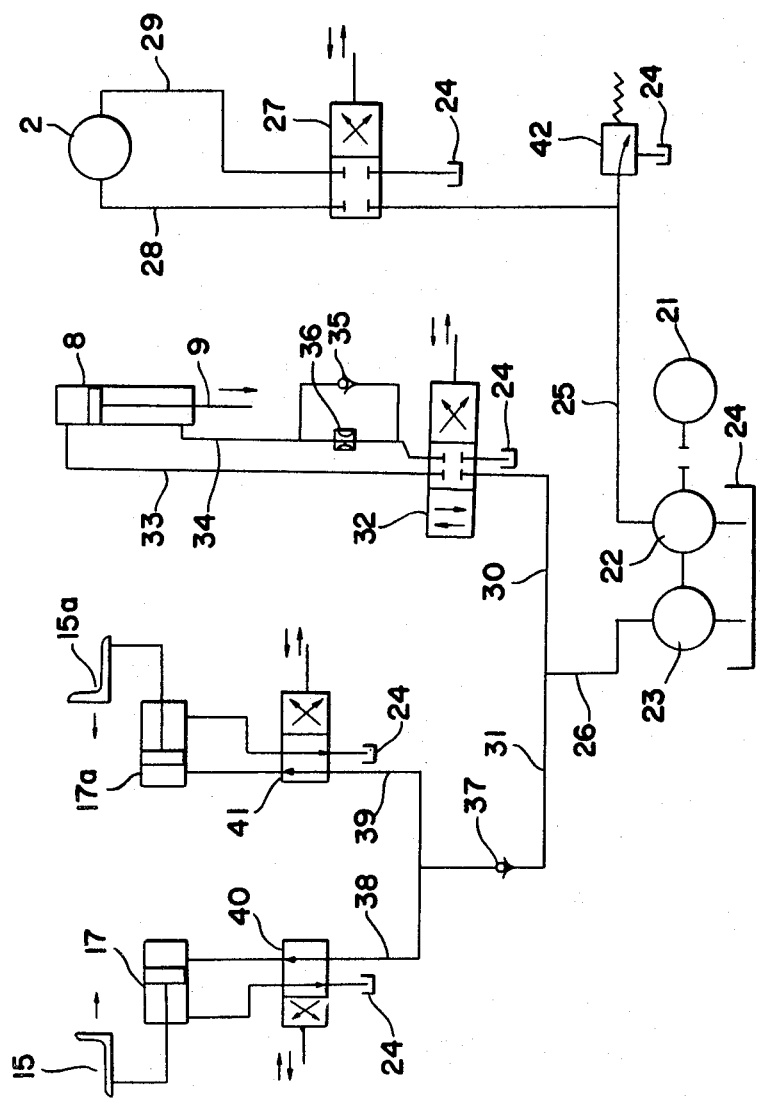

United States Patent Office 3,625,102
Patented Dec. 7, 1971

3,625,102
CIRCULAR SAWING MACHINE WITH A
PAIR OF VISES
Fumio Shiino, 34–3, 4-chome, Egota, Nakano-ku,
Tokyo, Japan
Filed Oct. 3, 1969, Ser. No. 863,552
Claims priority, application Japan, Oct. 5, 1968,
43/72,418
Int. Cl. B23d 45/02; B27b 5/18
U.S. Cl. 83—460                                   4 Claims

ABSTRACT OF THE DISCLOSURE

This disclosure relates to a circular sawing machine with a pair of vises comprising a circular saw driven with a pressure oil motor, guide members guiding said circular saw and pressure oil motor integrally, and vises for holding the works on both sides of said guide members, and the object of this invention is to provide a machine which is made of simple construction, and in which efficiency and accuracy of cutting are obtained due to the cutting on two positions on both sides of the moving line.

This invention relates to a circular sawing machine, and more especially to a circular sawing machine with a pair of vises for fixing the works to be cut on both sides of the vertical center line of the machine, and with a circular saw driven by a pressure oil motor and moved up and down.

In existing circular sawing machines, it is conventional to drive the circular saw by means of an electric motor through the medium of a reduction gear and four or five steps pulleys, and to cut the works with a quadrant part on a lower part of one side of the saw. Therefore, such machines aforesaid have faults in that the space for the driving mechanism and the guide member for a saw must relatively be large, and efficiency of cutting is not sufficient due to the cutting on only one side of the saw.

According to the present invention, it is an object to provide the circular sawing machine in which the circular saw is driven by a pressure oil motor which is moved up and down along a guide member, and two vises are provided on a frame one on each side of said guide member, each inside jaw of said two vises being constituted respectively with each side surface of the guide member and each outside jaw being respectively adapted to be moved along the frame of the machine by the action of a pressure oil cylinder.

According to the present invention, since the pressure oil motor is used instead of the electric motor, the guide member can be made slender. And, since the work pieces to be cut can be held on both sides of the guide member in range of the diameter of the saw, and both quadrant parts of the lower part of the saw edge can cut the works simultaneously, the efficiency of cutting will be raised about twice larger than that of the existing machine. Furthermore, the center line of the guide of the saw being located on the center of a portion of cutting, preciseness of cutting is increased, and owing to using the pressure oil motor, it is possible to vary speed of rotation of the saw without steps, and to reduce the vibration, so that the life of the saw edge can be extended.

The invention will be clearly understood from the following description of the embodiment of the apparatus according to the invention which is given merely by way of example, by reference to the accompanying drawings, wherein:

FIG. 4 represents schematic view of an embodiment of a fluid control circuit used for the apparatus in accordance with the invention.

Figure 1:
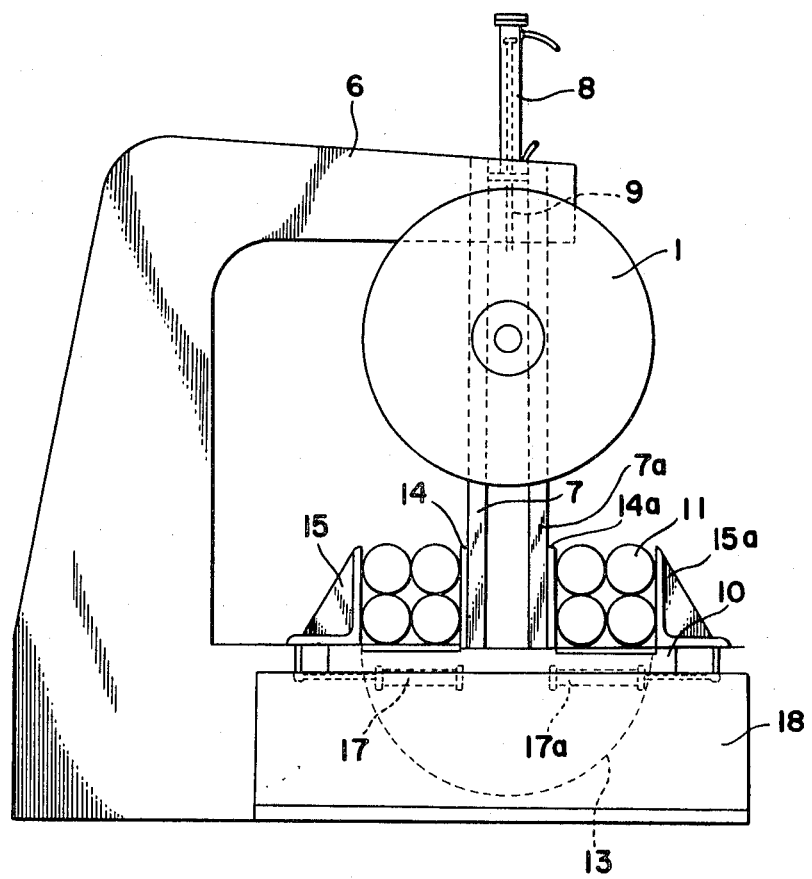
FIG. 1 represents in front view the circular sawing machine in accordance with the invention.
Figure 2:
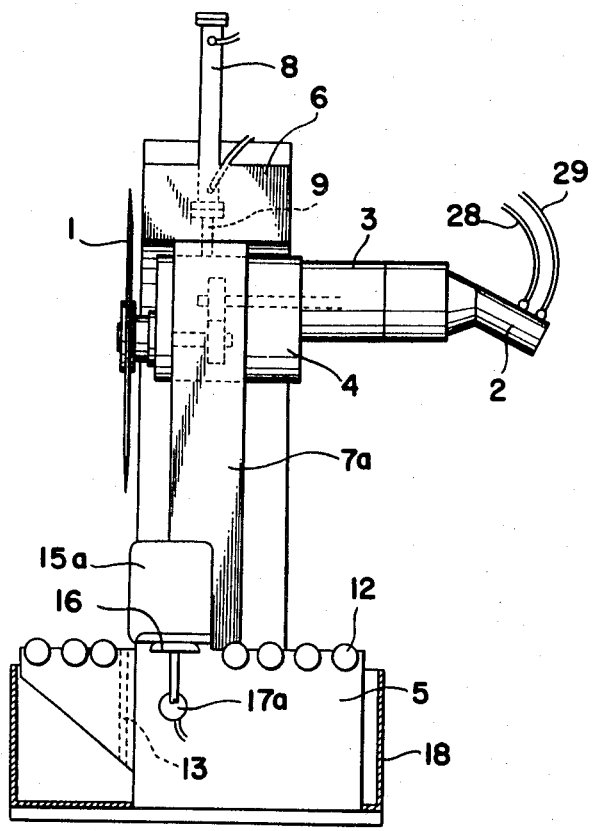
FIG. 2 represents in side view the same machine.
Figure 3:
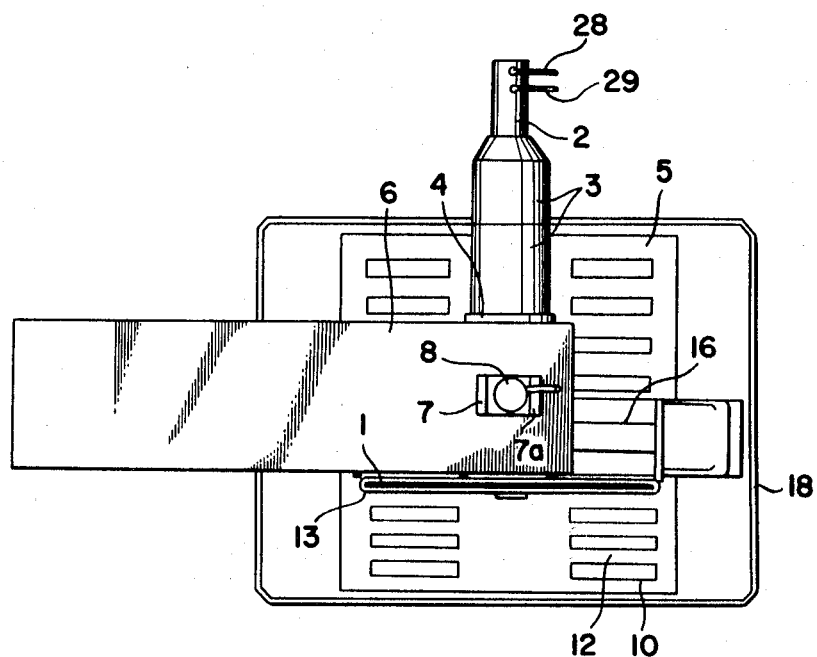
FIG. 3 represents in plan view the same machine.

Referring now to FIGS. 1, 2, and 3, the circular saw 1 of the circular sawing machine is fixed on the output shaft of the reduction gear 4 and the main bearing head 3 of the pressure oil motor 2, and driven by said motor 2. A part of said reduction gear 4 is guided between guide members 7 and 7a to be moved up and down, and those guide members 7 and 7a are vertically fixed between the machine frame 5 and the support 6 thereof. The said part of the reduction gear 4 is also fixed to the piston rod 9 of the pressure oil cylinder 8 upstanding on said support 6.

In the front of said machine frame 5, is fixed the front platform 10 the surface of which is a same plane of the surface of the same machine frame 5, and there are provided a plurality of rollers 12 on surfaces of said machine frame 5 and platform 10 in order to supply the work pieces 11 to be cut to both sides of the above-mentioned guide members 7 and 7a from the rear. Besides, on the platform 10 the hole 13 of relief is provided and which is adapted to be of use when the circular saw is descending.

On the other hand, there are provided a pair of vises 14, 15, and 14a, 15a one on each side of the guide members 7 and 7a and on the front surface of the machine frame 5 in order to hold the work pieces 11. In the embodiment of the machine illustrated in the drawings, one of jaws, that is, the inside jaws 14 and 14a are respectively fixed to the guide members 7 and 7a, and the other jaws, that is, the outside jaws 15 and 15a are respectively adapted to be able to slide on the surface of the machine frame 5, being conducted with a guide device, for instance, such as a dovetail groove 16, in order to approach to or leave from the guide members 7 and 7a. These jaws 15, 15a moved respectively by means of the pistons in the pressure oil cylinders 17, 17a stored in the machine frame 5. In the embodiment illustrated in the drawings, the strokes of the movement of said pistons and jaws 15, 15a are equal. However, if certain pieces were provided to be moved by the pistons, they had several holes arranged longitudinally, and any one of holes of said pieces were engaged by the projections upstanding from the bottom surfaces of jaws 15, 15a, both jaws 15, 15a should be located at or near the given position, and then moved with aid of the pressure oil cylinders 17, 17a to said given position so that it would be convenient to allow the pressure oil cylinders of short stroke to be used for clamping the works. Numeral 18 represents an oil pan.

Now, a hydraulic control system illustrated in FIG. 4 as an example of an embodiment of the system will be described as follows:

The electric motor 21 drives the pump 22 of variable stroke plunger type and the pump 23 of variable pitch vane type through the medium of a clutch. The pump 22 feeds oil under pressure from the reservoir 24 through pipe 25 to the above mentioned pressure oil operated plunger motor 2 for driving the circular saw 1 and the pump 23 feeds oil under pressure to the pressure oil cylinder 8 for descending and ascending the circular saw 1 and to the pressure oil cylinders 17, 17a for operating the jaws 15, 15a of the vises respectively. The pipe 25 is connected to said pressure oil motor 2 through the pipes 28, 29 through the medium of the known two way cross valve 27, and return oil thereof is returned back to the oil reservoir 24. The pipe 26 is branched to the pipe 30 and the pipe 31, and the pipe 30 is connected to the top and the bottom of said pressure oil cylinder 8 respectively through the medium of three way cross valve 32. The pipe 34 connected to the bottom of the pressure oil cylinder 8 is branched to the pipe passing through the nonreturn valve 35 and the discharge regulator valve 36, and return oil is returned back to the same oil reservoir 24. This pipe is subjected to flow resistance according to said discharge regulator valve 36, when the circular saw is pressed down, and this pipe passes smoothly oil therein by aid of said nonreturn valve 35, when the circular saw is pushed up. Lastly the pipe 31 contains the nonreturn valve 37, and in front of it the pipe is branched into two pipes, each pipe being respectively connected to the tightening side and the loosening side for each jaws 15, 15a in the right and left pressure oil cylinders 17, 17a through the medium of each two way cross valve 40, 41, and return oil are respectively returned back to the oil reservoir 24. Numeral 42 in FIG. 4 represents a safety valve.

It will be noticed that the embodiment above described is a mere example, and of course, this invention can include various modifications within the scope of the following claims. For example, the apparatus in which the workpieces are held on both sides of the line of the movement of the circular saw moving integrally with the pressure oil motor and are cut simultaneously in two positions, falls within the scope of this invention, and the direction of the circular saw may include all the direction, for instance, of up and down, right and left, and inclined direction, and system of control may include of manual, automatic and semi-automatic.

What I claim is:

1. A circular sawing machine comprising, a circular saw mounted to rotate about an axis, a motor operatively connected to the circular saw to rotate the same about its axis, an elongated guide, said circular saw and said motor being connected to the guide for movement together along said guide in a direction generally perpendicular to the said axis, a pair of vises arranged adjacent the guide, one pair on each side of the path of movement of said axis, whereby as the circular saw and its motor move along the guide, the circular saw can simultaneously cut workpieces located in and held by each of said vises on both sides of the path of travel of the circular saw axis.

2. A circular sawing machine according to claim 1, wherein said guide includes a pair of vertically extending guide members, said circular saw axis extending through said guide member, and means for moving said circular saw and its motor vertically along said guide member, each vise including a first jaw positioned adjacent one side of the guide member and a second jaw spaced outwardly from the first jaw and movable towards and away from the first jaw.

3. A circular sawing machine according to claim 2, wherein both of said vises are located on the same side of the plane of the cutting saw.

4. A circular sawing machine according to claim 2, including a pressurized fluid circuit including first pump means for delivering fluid from a source for turning the circular saw about its axis and a second pump means for delivering fluid from a source to both operate both vises and to move the circular saw and its motor vertically.

References Cited

UNITED STATES PATENTS

| 269,736 | 12/1882 | Steinbach | 143—47 H |
|---|---|---|---|
| 1,126,212 | 1/1915 | Hendee | 83—488 X |
| 3,386,322 | 6/1968 | Stone et al. | 83—488 |

DONALD R. SCHRAN, Primary Examiner

U.S. Cl. X.R.

83—488; 143—47 H